(12) United States Patent
Li et al.

(10) Patent No.: US 12,498,157 B2
(45) Date of Patent: Dec. 16, 2025

(54) SYSTEMS, CONTROLLERS, AND METHODS FOR CONTROLLING A $CO_2$ REFRIGERATION SYSTEM

(71) Applicant: Copeland LP, Sidney, OH (US)

(72) Inventors: Daqing Li, Dayton, OH (US); Don R. Wiesmann, Troy, OH (US)

(73) Assignee: Copeland LP, Sidney, OH (US)

( * ) Notice: Subject to any disclaimer, the term of this patent is extended or adjusted under 35 U.S.C. 154(b) by 190 days.

(21) Appl. No.: 18/318,385

(22) Filed: May 16, 2023

(65) Prior Publication Data

US 2024/0384910 A1 Nov. 21, 2024

(51) Int. Cl.
*F25B 49/02* (2006.01)
*F25B 9/00* (2006.01)
*F25B 41/20* (2021.01)

(52) U.S. Cl.
CPC ............ *F25B 49/027* (2013.01); *F25B 9/008* (2013.01); *F25B 41/20* (2021.01); *F25B 2309/061* (2013.01); *F25B 2600/111* (2013.01); *F25B 2700/195* (2013.01); *F25B 2700/21161* (2013.01); *F25B 2700/21163* (2013.01)

(58) Field of Classification Search
CPC .. F25B 9/008; F25B 49/027; F25B 2309/061; F25B 2600/111; F25B 2700/195; F25B 2700/21161; F25B 2700/21163
See application file for complete search history.

(56) References Cited

U.S. PATENT DOCUMENTS

| | | | |
|---|---|---|---|
| 5,987,903 A * | 11/1999 | Bathla | F25B 49/005 62/126 |
| 8,745,996 B2 | 6/2014 | Qiao et al. | |
| 9,625,183 B2 | 4/2017 | Wallace et al. | |
| 10,830,499 B2 | 11/2020 | Rajendiran et al. | |
| 11,353,246 B2 | 6/2022 | Hayes et al. | |
| 2010/0000245 A1* | 1/2010 | Kasahara | F25B 13/00 62/222 |
| 2014/0151015 A1 | 6/2014 | Sun et al. | |
| 2017/0074569 A1* | 3/2017 | Kurata | F25B 49/027 |
| 2020/0124330 A1 | 4/2020 | Hayes | |

FOREIGN PATENT DOCUMENTS

CA 3045188 A1 12/2019

OTHER PUBLICATIONS

PCT International Search Report and Written Opinion, Application No. PCT/US2024/029282, dated Aug. 22, 2024, 13 pages.

* cited by examiner

*Primary Examiner* — Jonathan Bradford
(74) *Attorney, Agent, or Firm* — Armstrong Teasdale LLP (57) ABSTRACT

A controller for a CO2 refrigeration system includes at least one input configured to receive an inlet air temperature from a first temperature sensor, an exit temperature from a second temperature sensor and an exit pressure from a pressure sensor, at least one output for controlling the valve and the fan, a memory, and a processor. The processor is configured by instructions stored in the memory to receive, through the at least one input, the inlet air temperature from the first temperature sensor, and control, through the at least one output, the valve and the fan based on the inlet air temperature both when the CO2 refrigeration system is operating in a transcritical mode and when the CO2 refrigeration system is operating in a subcritical mode.

20 Claims, 5 Drawing Sheets

SYSTEMS, CONTROLLERS, AND METHODS FOR CONTROLLING A $CO_2$ REFRIGERATION SYSTEM

BACKGROUND

This application relates generally to controlling refrigeration systems. More specifically, this application relates to systems, controllers, and methods for controlling a $CO_2$ refrigeration system.

Known $CO_2$ refrigeration systems typically use a two-mode control structure to change the control mode depending on whether the system is operating in subcritical operation mode or in transcritical operation mode. The mode switch is typically based on user choice of a threshold temperature. In some systems, the threshold temperature is the critical temperature of the refrigerant ($CO_2$). The subcritical mode is employed when the temperature of the refrigerant at an output of a gas cooler/condenser is below the critical temperature and the transcritical mode being used when the temperature of the refrigerant at the output of the gas cooler/condenser is at or above the critical temperature. Such two-mode control schemes may cause a system to switch back and forth between modes by itself even when the unit surrounding environmental conditions does not change at all, particularly when operation conditions are in the region near the critical temperature. the mode switch is typically based on user choice of a threshold temperature. For at least some heat reclaim applications, the unit may only operate in transcritical mode in order to boost heat production even at low ambient and low gas cooler exit CO2 temperature.

Additionally, at least known systems attempt to control a pressure at the output of the gas cooler/condenser to a target pressure determined from the temperature of the refrigerant at the output of the gas cooler/condenser. Due to the changing pressure, the temperature of the refrigerant at the output of the gas cooler/condenser, which may result in the system changing the pressure target to a target determined from the new temperature, which will again cause the temperature to change. This "tail chasing" is often noticed when the gas cooler/condenser heat transfer performance is degraded or undersized and the temperature of the refrigerant at the output of the gas cooler/condenser does not follow the temperature of the air input to the gas cooler/condenser.

In subcritical mode, the subcooling at the gas cooler exit becomes a control target in some systems. This typically involve changing the control algorithm for the gas cooler pressure control valve as it now serves as a subcooling control valve. This also is a primary reason that two modes control method is often adopted for use in $CO_2$ systems. To avoid instability in subcooling control, typically a minimal condensing pressure limit is imposed to run the system at a condensing temperature much higher than the inlet air temperature. As a result, the system running at a lower efficiency to maintain stability.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

According to one aspect of this disclosure, a CO2 refrigeration system operable in a subcritical mode and a transcritical mode includes a compressor, a gas cooler/condenser that receives refrigerant discharged from the compressor and outputs a flow of refrigerant, a valve connected to an output of the gas cooler/condenser to control the flow of refrigerant from the gas cooler/condenser, a fan positioned to supply a flow of air into the gas cooler/condenser, a first temperature sensor positioned to detect an inlet air temperature of flow of the air into the gas cooler/condenser, a second temperature sensor positioned to detect an exit temperature of the flow of refrigerant from the gas cooler/condenser; a pressure sensor positioned to detect an exit pressure of the refrigerant in the flow of refrigerant from the gas cooler/condenser, and a controller having a processor and a memory. The gas cooler/condenser is operable as a gas cooler when the CO2 refrigeration system is operating in the transcritical mode and as a condenser when the CO2 refrigeration system is operating in the subcritical mode and the fan includes a motor. The processor is configured by instructions stored in the memory to: receive the inlet air temperature from the first temperature sensor and control the valve and the fan based on the inlet air temperature both when the CO2 refrigeration system is operating in the transcritical mode and when the CO2 refrigeration system is operating in the subcritical mode.

Another aspect of this disclosure is a controller for a CO2 refrigeration system including a compressor, a gas cooler/condenser that receives refrigerant discharged from the compressor and outputs a flow of refrigerant, a valve connected to an output of the gas cooler/condenser to control the flow of refrigerant from the gas cooler/condenser, a fan positioned to supply a flow of air into the gas cooler/condenser, a first temperature sensor positioned to detect an inlet air temperature of the flow of air into the gas cooler/condenser, a second temperature sensor positioned to detect an exit temperature of the flow of refrigerant from the gas cooler/condenser, and a pressure sensor positioned to detect an exit pressure of the refrigerant in the flow of refrigerant from the gas cooler/condenser. The controller includes at least one input configured to receive the air temperature from the first temperature sensor, the exit temperature from the second temperature sensor and the exit pressure from the pressure sensor, at least one output for controlling the valve and the fan, a memory, and a processor. The processor is configured by instructions stored in the memory to receive, through the at least one input, the inlet air temperature from the first temperature sensor, and control, through the at least one output, the valve and the fan based on the inlet air temperature both when the CO2 refrigeration system is operating in a transcritical mode and when the CO2 refrigeration system is operating in a subcritical mode.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Like reference symbols in the various drawings indicate like elements.

DETAILED DESCRIPTION

Example embodiments will now be described more fully with reference to the accompanying drawings.

Figure 1:
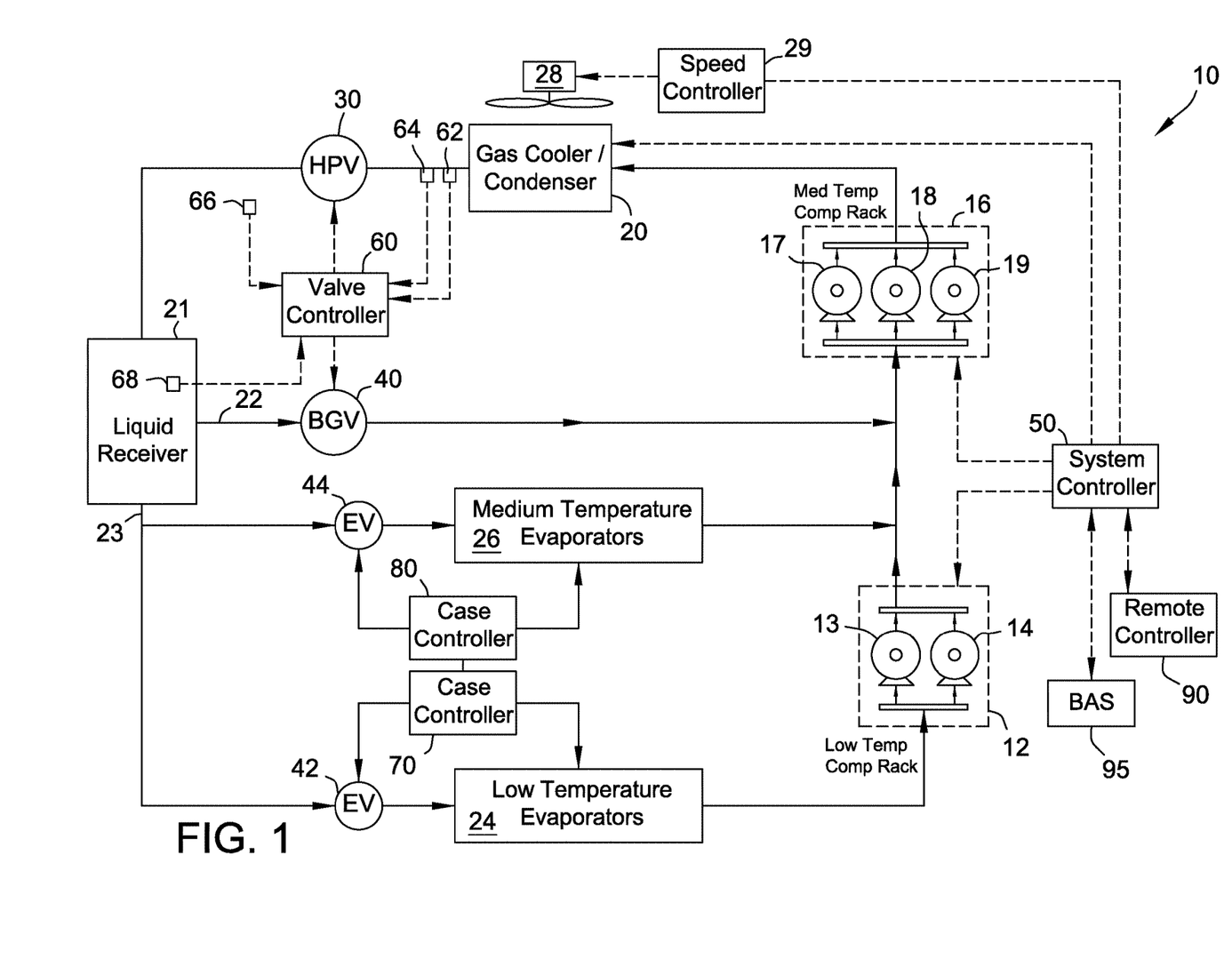
FIG. 1 is a schematic of an example $CO_2$ refrigeration system.

With reference to FIG. 1, a booster transcritical $CO_2$ refrigeration system 10 includes a low temperature compressor rack 12 with compressors 13, 14, and a medium temperature compressor rack 16 with compressors 17, 18, 19. The compressors 13, 14, 17, 18, 19 may be fixed capacity or variable capacity compressors. For example, each compressor rack 12, 16 may include at least one variable capacity compressor and at least one fixed capacity compressor. The compressors in each rack may be connected via appropriate suction and discharge headers. The low temperature compressor rack 12 may be connected in series with the medium temperature compressor rack 16 such that the refrigerant discharged from the low temperature compressor rack 12 is received on a suction side of the medium temperature compressor rack 16. The number of compressors shown is merely an example, other embodiments may include more or fewer compressors in each rack, including only one low temperature compressor and one medium temperature compressor.

Refrigerant (e.g., $CO_2$) discharged from the medium temperature compressor rack 16 is received by/input to a gas cooler/condenser 20. As described in further detail below, the refrigeration system 10 may be operable in a subcritical mode or in a transcritical mode. In the transcritical mode, the gas cooler/condenser 20 functions as a gas cooler. In the subcritical mode, the gas cooler/condenser 20 functions as a condenser. For simplicity, the gas cooler/condenser 20 may be referred to sometimes herein as a gas cooler or as a condenser without limiting the gas cooler/condenser 20 to only being operable or currently being operated as a gas cooler or as a condenser.

A fan 27 provides a flow of air into the gas cooler/condenser 20. The fan includes a motor 28 under the control of a speed controller 29. The speed controller 29 controls the speed of the motor 28 to control the flow of air into the gas cooler/condenser 20 in response to instructions from the system controller 50. In other embodiments, the speed controller 29 is incorporated in the system controller 50. In various embodiments, the fan 27 is a component of the gas cooler/condenser 20.

Refrigerant output from the gas cooler/condenser 20 is received by liquid receiver 21. Liquid receiver 21 is connected to a first discharge line 22 that routes gaseous refrigerant from the liquid receiver 21 back to the suction side of the medium temperature compressor rack 16. The liquid receiver 21 is also connected to a second discharge line 23 that routes liquid refrigerant from the liquid receiver 21 to evaporators 24, 26.

Refrigerant routed from the liquid receiver 21 via the second discharge line 23 is received by the low temperature evaporators 24 and the medium temperature evaporators 26. The low temperature evaporators 24 may include, for example, grocery store freezers or frozen food cases. The medium temperature evaporators 26 may include, for example, dairy or meat cases.

Refrigerant from the low temperature evaporator 24 is then discharged to the suction side of the low temperature compressor rack 12. Refrigerant from the medium temperature evaporators 26 is then discharged to the suction side of the medium temperature compressor rack 16. The refrigeration cycle then starts anew.

The refrigeration system 10 may include various valves, controlled by various associated controllers, to monitor and regulate the various temperatures and pressures within the refrigeration system 10 to maintain efficient and desirable operation.

Specifically, refrigeration system 10 includes a high pressure valve (HPV) 30 and a bypass gas valve (BGV) 40. As shown in FIG. 1, the HPV 30 is connected between the output of gas cooler/condenser 20 and the liquid receiver 21. The BGV 40 is located on the first discharge line 22 between the liquid receiver 21 and the suction side of the medium temperature compressor rack 16. As described in further detail below, HPV 30 and BGV 40 are adjusted and controlled to maintain certain system operating conditions for efficient and desirable operation. For example, the HPV 30 controls the flow of refrigerant from the gas cooler/condenser 20 to the liquid receiver 21. The BGV 40 controls the flow of refrigerant from the liquid receiver 21 to the suction side of the medium temperature compressor rack 16. The HPV 30 and the BGV 40 may include, for example, associated stepper motors for variable adjustment of the valve openings.

The low temperature evaporators 24 and the medium temperature evaporators 26 each include an associated expansion valve (EV) 42, 44.

The refrigeration system 10 includes various controllers that monitor operating and environmental conditions, including temperature and pressures, and control the various system components according to programmed control strategies. Specifically, a system controller 50 controls the compressor racks 12, 16 by activating, deactivating, and adjusting the compressors 13, 14, 17, 18, 19, of the compressor racks 12, 16. The system controller 50 also controls the gas cooler/condenser 20 by activating, deactivating, and adjusting fans of the gas cooler/condenser 20. The system controller 50 may be any suitable controller including a processor and memory storing appropriate instructions executable by the processor to program the processor to operate in accordance with the present disclosure. The system controller 50 may include a user interface, such as a touchscreen or a display screen and user input device, such as a keyboard, to communicate with a user. For example, the system controller 50 may output system parameters, such as system operating temperatures or pressures, and/or system setpoints to a user. Further, the system controller 50 may receive user input modifying the system setpoints or control algorithms.

The refrigeration system 10 includes a valve controller 60 programmed to control the HPV 30 and the BGV 40. Although illustrated as a separate component, in some embodiments, some or all functions of the valve controller may be included in the system controller 50, actions ascribed to the valve controller 60 may be performed by the system controller 50, and/or the system controller may be communicatively coupled to the valve controller 60 to control the HPV and/or the BGV by instructing the valve controller 60. The valve controller 60 is connected to various temperature and pressure sensors to monitor system and environmental conditions. Specifically, the valve controller 60 is connected to a refrigerant temperature sensor 62 that senses an exit temperature of refrigerant exiting the gas cooler/condenser 20. The valve controller 60 is also connected to a refrigerant pressure sensor 64 that senses an exit pressure of refrigerant exiting the gas cooler/condenser 20. While separate pressure and temperature sensors are shown in FIG. 1, alternatively a single combination refrigerant pressure and temperature sensor could be used to sense both the pressure and temperature of refrigerant exiting the gas cooler/condenser 20. The valve controller 60 is also connected to a temperature sensor 66 that senses a temperature of the flow of air from the fan 27 into to the gas cooler/condenser 20, sometimes referred to as the inlet air temperature. In other embodiments, the temperature sensor 66 senses an outdoor ambient temperature, which may be the temperature of the air that will be directly or indirectly input to the gas cooler/condenser. The valve controller 60 is also connected to a liquid receiver pressure sensor 68 that senses a pressure of refrigerant within the liquid receiver 21. As discussed in further detail below, the valve controller 60 controls the openings of the HPV 30 and BGV 40 to maintain efficient and desirable operation of the refrigeration system 10 in both subcritical and transcritical modes.

The valve controller 60 may be any suitable controller having appropriate programming in accordance with the present disclosure for controlling the HPV 30 and BGV 40. Further, the valve controller 60 may include a user interface, such as a touchscreen or a display screen and user input device, such as a keyboard, to communicate with a user. For example, the valve controller 60 may output system parameters, such as system operating temperatures or pressures, and/or system setpoints to a user. Further, the valve controller 60 may receive user input modifying the system setpoints or control algorithms.

The refrigeration system 10 also includes case controllers 70, 80 for controlling the low temperature evaporators 24 and medium temperature evaporators 26 and the associated expansion valves 42, 44. For example, the case controllers 70, 80 may activate, deactivate, and adjust the evaporator fans of the evaporators 24, 26. The case controllers may also adjust the expansion valves 42, 44. The case controllers 70, 80 may be any suitable controller with appropriate programming in accordance with the present disclosure. Moreover, the case controllers may be implemented as part of the system controller 50. Further, the case controllers 70, 80 may include a user interface, such as a touchscreen or a display screen and user input device, such as a keyboard, to communicate with a user. For example, the case controllers 70, 80 may output system parameters, such as system operating temperatures or pressures, and/or system setpoints to a user. Further, the case controllers 70, 80 may receive user input modifying the system setpoints or control algorithms.

Each of the controllers shown in FIG. 1 is operable to communicate with each other. For example, the system controller 50 may adjust operation or setpoints of the valve controller 60 and the case controllers 70, 80. Further, if a local sensor of the valve controller 60 fails, it may communicate with the system controller 50 or the case controllers 70, 80 to adjust operation accordingly. For example, if the local temperature sensor 66 of the valve controller 66 fails, it may communicate with the system controller 50 or the case controllers 70, 80 to receive inlet air temperature data or ambient air temperature data from a temperature sensor connected or accessible to the system controller 50 or the case controllers 70, 80. Further, as noted above, the valve controller and case controllers 70, 80 may be implemented (as hardware, software, or both) in the system controller 50 in whole or in part and the system controller 50 may perform the functions ascribed herein to the other controllers. In some embodiments, the system controller 50 performs some or all of the actions of the other controllers by instructing the valve controller 60 and/or the case controllers 70, 80 to perform the operations.

Additionally, a remote computer 90 may be connected to the system controller 50 so that a remote user can log into the system controller 50 and monitor, control, or adjust operation of any of the controllers, including the system controller 50, the valve controller 60, and the case controllers 70, 80.

Additionally, the system controller 50 may be in communication with a building automation system (BAS) 95. The BAS 95 may be connected to additional temperature and pressure sensors and may monitor and store additional temperature and pressure data that can be accessed by the system controller 50, and/or the valve controller 60, in the event of a sensor failure. The remote computer 90 can also be connected to the BAS 95 so that a remote user can log into the BAS 95 and monitor, control, or adjust operation of any of the controllers, including the system controller 50, the valve controller 60, and the case controllers 70, 80.

Figure 2:
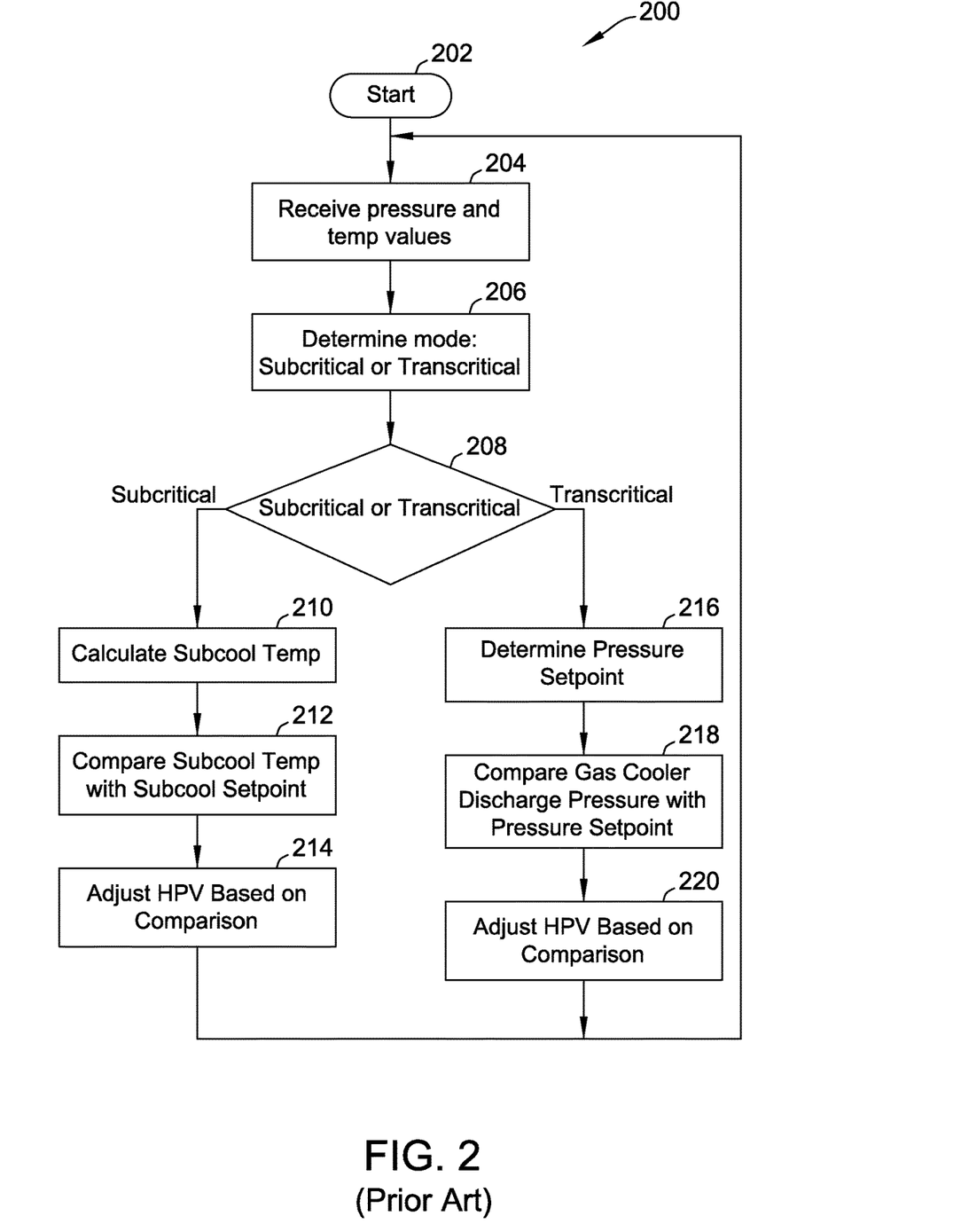
FIG. 2 is a flowchart of a prior art control algorithm for the $CO_2$ refrigeration system of FIG. 1.

With reference to FIG. 2, a prior art control algorithm 200 is shown for adjusting the HPV 30. The control algorithm 200 may be performed by valve controller 60. Alternatively, the control algorithm 200 may be performed by system controller 50, which may output appropriate control signals to valve controller 60 or directly to the HPV 30. During operation of the system using the control algorithm 200, the fan speed is controlled by the speed controller 29 using a non-feedback control based on air inlet temperature or other criteria. The control algorithm 200 starts at 202. At 204, the valve controller 60 receives pressure and temperature values from the connected pressure and temperature sensors 62, 64, 66, 68. Specifically, the valve controller 60 receives data indicating the pressure and temperature of refrigerant exiting the gas cooler/condenser 20, the ambient air temperature, and the pressure within the liquid receiver 21. In this prior art example, the sensor 66 is an outdoor ambient temperature sensor.

At 206, the valve controller 60 determines whether the refrigeration system 10 is operating in a subcritical or a transcritical mode. For example, valve controller 60 may compare a current system or operating condition with a particular system or operating condition setpoint. As an example, valve controller 60 may compare the current ambient air temperature with a temperature setpoint to determine whether the refrigeration system 10 is in subcritical or transcritical mode. When air temperature is above the temperature setpoint, the valve controller 60 may determine that the refrigeration system 10 is in transcritical mode. When the air temperature is below the temperature setpoint, the valve controller 60 may determine that the refrigeration system 10 is in subcritical mode. For example, the temperature setpoint may be 14 degrees Celsius. As another example, the valve controller 60 may compare the current air temperature with the temperature setpoint minus a predetermined hysteresis value. In such case, for example, the temperature setpoint may be 21 degrees Celsius and the hysteresis value may be 7 degrees Celsius. Both the temperature setpoint and the hysteresis value may be user configurable. Alternatively, the valve controller 60 may make the determination by comparing the current temperature and/or pressure of refrigerant exiting the gas cooler/condenser 20 with a temperature or pressure setpoint. Alternatively, the valve controller 60 may evaluate the air temperature in combination with the pressure and/or temperature of refrigerant exiting the gas cooler/condenser 20 to make the determination as to whether the refrigeration system 10 is operating in a subcritical mode or a transcritical mode.

At 208, when the refrigeration system 10 is in subcritical mode, the valve controller 60 proceeds to 210. At 210, the valve controller 60 calculates a current subcooling temperature based on the temperature and pressure of refrigerant exiting the gas cooler/condenser 20. Specifically, based on the temperature and pressure of refrigerant exiting the gas cooler/condenser 20, the valve controller 60 can determine the critical point of the refrigerant. The valve controller 60 may then compare the critical point of the refrigerant with the current temperature of the refrigerant exiting the gas cooler/condenser 20. The valve controller 60 may determine the subcooling temperature value to be the difference between the critical point of the refrigerant and the current temperature of the refrigerant exiting the gas cooler/condenser 20.

At 212, the valve controller 60 compares the subcooling temperature with a subcooling temperature setpoint and determines a difference between the two values. For example, the subcooling temperature setpoint may be 10 degrees Celsius.

At 214, the valve controller 60 adjusts the HPV 30 based on the comparison. Specifically, the valve controller 60 adjusts the HPV 30 to drive the current subcooling temperature value toward the subcooling temperature setpoint. The valve controller 60 may use a PID control algorithm, a PI control algorithm, fuzzy logic, or a neural network type control system/algorithm to make appropriate adjustments to the HPV 30. After adjusting the HPV 30, the valve controller loops back to 204.

At 208, when the refrigeration system 10 is in transcritical mode, the valve controller 60 proceeds to 216. At 216, the valve controller 60 determines a pressure setpoint. For example, the valve controller 60 may reference a lookup table that includes pressure setpoints indexed based on a system or environmental operating condition. For example, the lookup table may include pressure setpoints indexed based on ambient air temperature. As such, valve controller 60 may determine the current ambient air temperature and may access the lookup table to determine the corresponding pressure setpoint. If the current ambient air temperature is between table entries, the valve controller 60 may interpolate a pressure setpoint based on the nearest table entries. The lookup table may be stored in a memory included in, or accessible to, the valve controller 60. For example, the lookup table may be stored at the system controller 50 and the valve controller 60 may query the system controller 50 to obtain the pressure setpoint. Alternatively, the lookup table may include pressure setpoints indexed based on a temperature or pressure of refrigerant exiting the gas cooler/condenser 20, or another system or environmental operating temperature or pressure.

The lookup table may be specific to, and optimized for, a particular model, size, or type of compressor(s) or other system component(s). For example, the system controller 50 may query the individual compressors 13, 14, 17, 18, 19 in the compressor racks 12, 16 or the system controller 50 to identify the compressors present in the refrigeration system 10 and may determine the most appropriate lookup table, or may generate an installation specific lookup table, based on the identified compressors included in the refrigeration system 10. For example, each compressor 13, 14, 17, 18, 19 may include an individual compressor controller and/or a non-volatile memory with sufficient identification information identifying the model, size, or type of compressor. The identification information may be utilized to determine the most appropriate lookup table. Specific lookup tables may be generated beforehand based on field data or experimental data, and/or based on modeled data corresponding to operation of individual compressor models, sizes, types, etc. Further, models for specific compressors may be generated based on field data and/or experimental data, and then interpolated to other similar compressors.

Alternatively, valve controller 60 may calculate the pressure setpoint as a function of the inlet air temperature. Alternatively, valve controller 60 may determine the pressure setpoint based on other system or environmental data, such as the temperature or pressure of the refrigerant exiting the gas cooler/condenser 20.

At 218, the valve controller 60 compares the pressure of refrigerant exiting the gas cooler/condenser 20 with the determined pressure setpoint. At 220, the valve controller 60 then controls the HPV 30 based on the comparison. Specifically, the valve controller 60 adjusts the HPV 30 to drive the current pressure value toward the determined pressure setpoint. The valve controller 60 may use a PID control algorithm, a PI control algorithm, fuzzy logic, or a neural network type control system/algorithm to make appropriate adjustments to the HPV 30. After adjusting the HPV 30, the valve controller loops back to 204.

Figure 3:
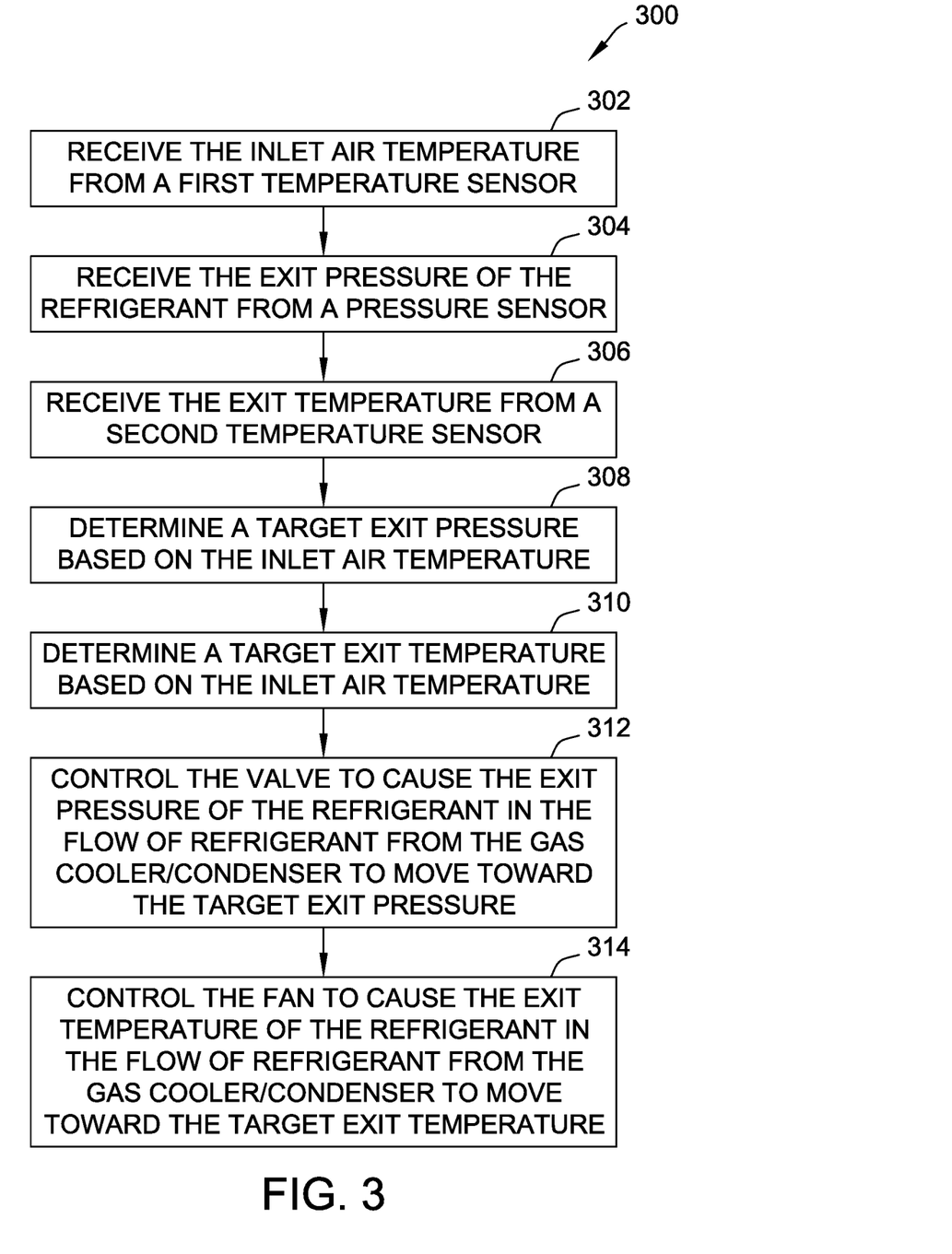
FIG. 3 is a flowchart of an example control algorithm of this disclosure for the $CO_2$ refrigeration system of FIG. 1.

FIG. 3 is a flow diagram of a control algorithm 300 of the present disclosure for controlling a CO2 refrigeration system, such as the system 10 in FIG. 1. In this example, the temperature sensor 66 is an inlet air temperature sensor that senses the temperature of the flow of air from the fan 27 into to the gas cooler/condenser 20. The control algorithm 300 will be described as being performed by system controller 50 in the example embodiment. In other embodiments, the control algorithm 300 may be performed by valve controller 60 and speed controller 29.

At 302, the controller 50 receives the inlet air temperature from the temperature sensor 66. At 304, the controller 50 receive the exit pressure of the refrigerant in the flow of refrigerant from the gas cooler/condenser from the pressure sensor 64, and the controller 50 receives the exit temperature of the refrigerant in the flow of refrigerant from the gas cooler/condenser from the temperature sensor 62.

The controller 50 determines a target exit pressure based on the received inlet air temperature at 310. The target exit pressure may be determined by calculation using an equation with the inlet air temperature as the input. Any equation that relates inlet air temperature to desired exit pressure may be used. In an example embodiments, the equation is a fifth order polynomial equation. One example equation suitable for use in determining the target exit pressure from the inlet air temperature is:

$$y = -3 \cdot 10^{-6} x^5 + 0.0003 x^5 - 0.0081 x^3 + 0.0948 x^2 + 0.7689 x + 40.559 \quad (1)$$

The numbers used in equation (1) are rounded, may be different for different systems, and are intended as on non-limiting example of a fifth order polynomial that may be used to determine a target exit pressure based on the inlet air temperature. In other embodiments, the controller 50 determines the target exit pressure using a lookup table stored in the memory of the controller 50. The lookup table may include specific target exit pressures for specific inlet air temperature. Controller 50 may access the lookup table to determine the target exit pressure corresponding to the inlet air temperature. If the received inlet air temperature is between table entries, the controller 50 may interpolate a target exit pressure based on the nearest table entries. The lookup table may be specific to, and optimized for, a particular model, size, or type of compressor(s) or other system component(s). For example, the system controller 50 may query the individual compressors 13, 14, 17, 18, 19 in the compressor racks 12, 16 or the system controller 50 to identify the compressors present in the refrigeration system 10 and may determine the most appropriate lookup table, or may generate an installation specific lookup table, based on the identified compressors included in the refrigeration system 10. For example, each compressor 13, 14, 17, 18, 19 may include an individual compressor controller and/or a non-volatile memory with sufficient identification information identifying the model, size, or type of compressor. The identification information may be utilized to determine the most appropriate lookup table. In other embodiments, a user or installer may identify the equipment to the controller 50, may select a particular lookup table to use, may modify an existing table, or may create a unique table. Specific lookup tables may be generated beforehand based on field data or experimental data, and/or based on modeled data corresponding to operation of individual compressor models, sizes, types, etc. Further, models for specific compressors may be generated based on field data and/or experimental data, and then interpolated to other similar compressors.

In some embodiments, the controller 50 determines the target exit pressure by determining the saturation pressure of the refrigerant at a calculated temperature that is the sum of the inlet air temperature and a preset temperature differential. In one example, the preset temperature differential is about eleven degrees Fahrenheit. In other embodiments, other preset temperature differentials may be used. The controller 50 determines the saturation pressure at the calculated temperature using an equation, a lookup table, or by any other suitable technique.

For $CO_2$, 1070 pounds per square inch absolute (PSIA) is the critical pressure of the fluid and setting the target exit pressure near that pressure should be avoided. Thus, the controller 50 is configured to determine the target exit pressure to avoid a target exit pressure of 1070 PSIA plus or minus a preset pressure difference. In one example, the preset pressure difference is ±30 PSIA. In other embodiments, the preset pressure difference may be any other suitable value and may be use/installer configurable. If the calculated target exit pressure would be within the forbidden range of pressures, the controller 50 may round the target exit pressure (up or down) to a value outside of the range of 1070 PSIA plus or minus the preset pressure differential.

In above pressure target setting, the compressor operation envelope's limitation on the lowest discharge pressure can also be incorporated in the lookup table or the maximum value of this low limit pressure with the suggested discharge pressure may be used to make sure compressor will not operate outside its envelope.

At 310, the controller 50 determines a target exit temperature based on the received inlet air temperature. In the example embodiment, if the inlet air temperature is greater than or equal to a preset temperature threshold, the controller determines the target exit temperature as a sum of the inlet air temperature and a preset first air temperature differential. Typically, the temperature differential can be set as zero or close to zero to provide a 100% fan speed output when the pressure target is above critical pressure. When the pressure target is below the critical pressure, the maximum subcooling at the gas cooler exit or the minimum temperature target is determined by the saturation liquid enthalpy at liquid receiver pressure or can be calculated as average of the saturation temperature at gas cooler pressure and the saturation temperature at liquid receiver pressure as a simple implementation. In the example embodiment, the preset temperature threshold is seventy-seven degrees Fahrenheit. Other embodiments may use any other suitable temperature threshold. If the inlet air temperature is less than the preset temperature threshold, the controller 50 sets the target exit temperature as the saturation temperature of the refrigerant at the target exit pressure determined above minus a preset second air temperature differential.

After setting the target exit pressure and the target exit temperature, at 312 the controller 50 controls HPV 30 to cause the exit pressure of the refrigerant in the flow of refrigerant from the gas cooler/condenser 20 to move toward the target exit pressure. At 314, the controller 50 controls the fan 27 to cause the exit temperature of the refrigerant in the flow of refrigerant from the gas cooler/condenser 20 to move toward the target exit temperature by selectively increasing or decreasing the speed of the motor 28. The speed of the fan motor may be set/controlled directly by the controller 50, or the controller 50 may command the speed control 29 to control the fan motor to 100%. In the example embodiment, if the inlet air temperature is above or equal to the preset temperature threshold, the controller sets the speed of the motor 28 of the fan 27 to 100%.

Thus, the controller 50 of the present disclosure controls the HPV 30 and the fan 27 based on the inlet air temperature both when the $CO_2$ refrigeration system is operating in the transcritical mode and when the $CO_2$ refrigeration system is operating in the subcritical mode. That is, the controller 50 uses both the HPV 30 and the fan 27 together to control the system, does so based on the inlet air temperature, does not need to determine if the system is in the transcritical mode or the subcritical mode, and does not need two different control schemes for the two different modes.

The control techniques described herein may avoid the artificial low limit of gas cooler condensing temperature at low ambient conditions that is found in at least some known systems, which may improve the system efficiency at low ambient condition. In some known systems controller, there is a low limit of gas cooler condensing temperature of 15° C. (59° F.) being set no matter how low the ambient (or inlet) air temperature is in order to avoid system instability. This hurts the system efficiency due to running the system at a higher than needed condensing pressure. In the systems of the current application, the HPV is adjusted to bring the reading of the exit pressure sensor to its target. The fan speed controller is used to bring the reading of the exit temperature sensor to its target. When both sensors are controlled to their target, the subcooling requirement is automatically satisfied without the need for the artificial low limit found on other known systems. Thus, the systems of the current disclosure may operate at a lower condensing pressure at low ambient condition to improve the system efficiency.

Optimal gas cooler pressure at given gas cooler exit temperature may also be maintained by using the control schemes described herein. Although gas cooler/condenser exit pressure target is not set directly from the reading of the gas cooler/condenser exit temperature in transcritical operation as is done in some known systems, the embodiments of this disclosure established will still satisfy optimal gas cooler pressure at given gas cooler exit temperature for CO2 transcritical operation when both pressure target and temperature target are reached in a stable operation.

Figure 4:
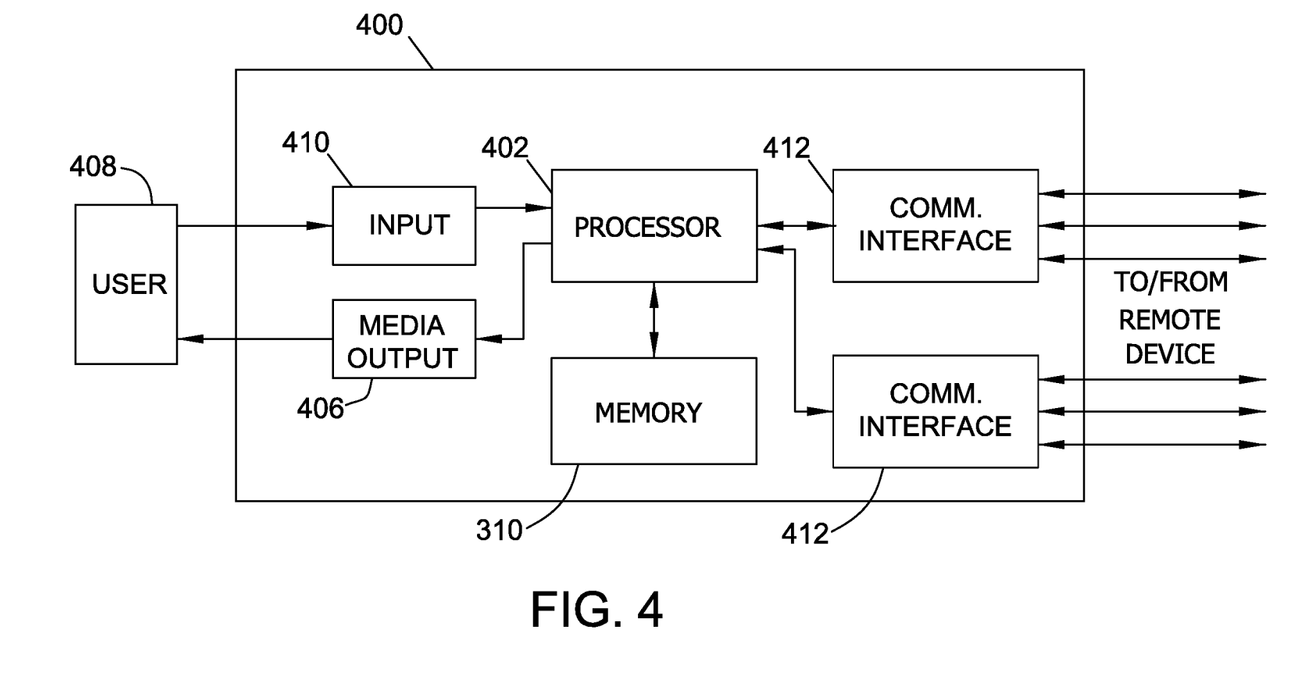
FIG. 4 is an example controller for use in the $CO_2$ refrigeration system of FIG. 1.

FIG. 4 is an example configuration of a computing device 400 for use as a controller (e.g., as the control system 50, the valve controller 60, the speed controller, and the like) in the $CO_2$ refrigeration system 10. The computing device 400 includes a processor 402, a memory 404, a media output component 406, an input device 410, and communications interfaces 412. Other embodiments include different components, additional components, and/or do not include all components shown in FIG. 4.

The processor 402 is configured for executing instructions. In some embodiments, executable instructions are stored in the memory 404. The processor 402 may include one or more processing units (e.g., in a multi-core configuration). The memory 404 is any device allowing information such as executable instructions and/or other data to be stored and retrieved. The memory 404 may include one or more computer-readable media.

The media output component 406 is configured for presenting information to user 408. The media output component 406 is any component capable of conveying information to the user 408. In some embodiments, the media output component 406 includes an output adapter such as a video adapter and/or an audio adapter. The output adapter is operatively connected to the processor 402 and operatively connectable to an output device such as a display device (e.g., a liquid crystal display (LCD), organic light emitting diode (OLED) display, cathode ray tube (CRT), "electronic ink" display, one or more light emitting diodes (LEDs)) or an audio output device (e.g., a speaker or headphones).

The computing device 400 includes, or is connected to, the input device 410 for receiving input from the user 408. The input device is any device that permits the computing device 400 to receive analog and/or digital commands, instructions, or other inputs from the user 408, including visual, audio, touch, button presses, stylus taps, etc. The input device 410 may include, for example, a variable resistor, a an input dial, keyboard/keypad, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 406 and the input device 410.

The communication interfaces 412 enable the computing device 400 to communicate with remote devices and systems, such as sensors, 62, 64, 66, valve controller 60, speed controller 29, compressor racks 16, 12, remote computing device 90, BAS 95, and the like. The communication interfaces 412 may be wired or wireless communications interfaces that permit the computing device to communicate with the remote devices and systems directly or via a network. Wireless communication interfaces 412 may include a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) Wired communication interfaces 412 may use any suitable wired communication protocol for direct communication including, without limitation, USB, RS232, I2C, SPI, analog, and proprietary I/O protocols. In some embodiments, the wired communication interfaces 412 include a wired network adapter allowing the computing device to be coupled to a network, such as the Internet, a local area network (LAN), a wide area network (WAN), a mesh network, and/or any other network to communicate with remote devices and systems via the network.

Figure 5:
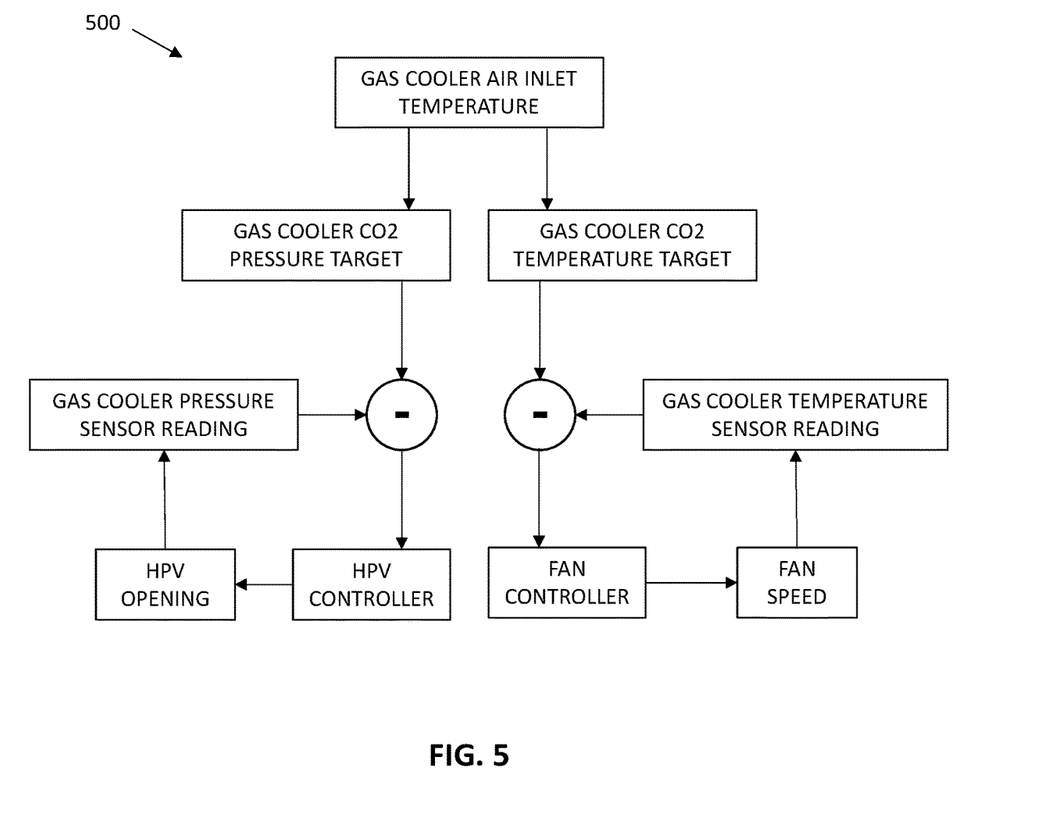
FIG. 5 is a flowchart of another example control algorithm of this disclosure for the $CO_2$ refrigeration system of FIG. 1.

FIG. 5 is a flow diagram of a control algorithm 500 of the present disclosure for controlling a CO2 refrigeration system, such as the system 10 in FIG. 1. In this algorithm, the gas cooler inlet air temperature reading is used to set the $CO_2$ exit temperature target. The gas cooler pressure target can be set by using the desired subcooling to determine the pressure target in the subcritical case and the optimal pressure for COP correlation can be used to setup the target in the transcritical case. Critical pressure is avoided in both cases. The valve controller 60 controls the HPV 30 using only feedback pressure control and the speed controller 29 controls the fan 27 using only feedback temperature control.

Example embodiments of systems and methods for controlling a $CO_2$ refrigeration system are described above in detail. The system is not limited to the specific embodiments described herein, but rather, components of the system may be used independently and separately from other components described herein. For example, the controller and processor described herein may also be used in combination with other systems and methods and are not limited to practice with only the system as described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A $CO_2$ refrigeration system operable in a subcritical mode and a transcritical mode, the system comprising:
   a compressor;
   a gas cooler/condenser that receives refrigerant discharged from the compressor and outputs a flow of refrigerant, the gas cooler/condenser operable as a gas cooler when the $CO_2$ refrigeration system is operating in the transcritical mode and as a condenser when the $CO_2$ refrigeration system is operating in the subcritical mode;
   a valve connected to an output of the gas cooler/condenser to control the flow of refrigerant from the gas cooler/condenser;

a fan positioned to supply a flow of air into the gas cooler/condenser, the fan including a motor;

a first temperature sensor positioned to detect an inlet air temperature of the flow of air into the gas cooler/condenser;

a second temperature sensor positioned to detect an exit temperature of the flow of refrigerant from the gas cooler/condenser;

a pressure sensor positioned to detect an exit pressure of the refrigerant in the flow of refrigerant from the gas cooler/condenser; and a controller having a processor and a memory, the processor configured by instructions stored in the memory to:

receive the inlet air temperature from the first temperature sensor;

determine a target exit pressure based on the inlet air temperature;

determine a target exit temperature based on the inlet air temperature; and control the fan based on the target exit temperature and the valve based on the target exit pressure both when the $CO_2$ refrigeration system is operating in the transcritical mode and when the $CO_2$ refrigeration system is operating in the subcritical mode, without determining whether the system is operating in the transcritical mode or the subcritical mode.

2. The $CO_2$ refrigeration system of claim 1, wherein the processor is configured to:

receive the exit pressure of the refrigerant from the pressure sensor; and control the valve based on the target exit pressure by controlling the valve to cause the exit pressure of the refrigerant in the flow of refrigerant from the gas cooler/condenser to move toward the target exit pressure.

3. The $CO_2$ refrigeration system of claim 2, wherein the processor is configured to determine the target exit pressure based on the inlet air temperature by inputting the inlet air temperature into an equation.

4. The $CO_2$ refrigeration system of claim 3, wherein the equation comprises a polynomial equation.

5. The $CO_2$ refrigeration system of claim 2, wherein the processor is configured to determine the target exit pressure based on the inlet air temperature using a lookup table stored in the memory.

6. The $CO_2$ refrigeration system of claim 2, wherein the processor is configured to determine the target exit pressure by determining a saturation pressure of the refrigerant at a calculated temperature that is a sum of the inlet air temperature and a preset temperature differential.

7. The $CO_2$ refrigeration system of claim 2, wherein the processor is configured to determine the target exit pressure to avoid a target exit pressure of 1070 pounds per square inch absolute (PSIA) plus or minus a preset pressure difference.

8. The $CO_2$ refrigeration system of claim 2, wherein the processor is configured to:

receive the exit temperature from the second temperature sensor; and control the fan based on the target exit temperature by controlling the fan to cause the exit temperature of the refrigerant in the flow of refrigerant from the gas cooler/condenser to move toward the target exit temperature.

9. The $CO_2$ refrigeration system of claim 8, wherein the processor is configured to:

control the fan to cause the exit temperature of the refrigerant in the flow of refrigerant from the gas cooler/condenser to move toward the target exit temperature by operating the motor of the fan at maximum speed when the inlet air temperature is above or equal to a preset temperature threshold; and control the fan to cause the exit temperature of the refrigerant in the flow of refrigerant from the gas cooler/condenser to move toward the target exit temperature by controlling a speed of the motor of the fan to selectively increase or decrease the flow of air into the gas cooler/condenser when the inlet air temperature is below the preset temperature threshold.

10. The $CO_2$ refrigeration system of claim 8, wherein the processor is configured to determine the target exit temperature as:

a sum of the inlet air temperature and a preset first air temperature differential when the inlet air temperature is above or equal to a preset temperature threshold; and a saturation temperature of the refrigerant at the target exit pressure minus a preset second air temperature differential when the inlet air temperature is below a preset temperature threshold.

11. A controller for a $CO_2$ refrigeration system including a compressor, a gas cooler/condenser that receives refrigerant discharged from the compressor and outputs a flow of refrigerant, a valve connected to an output of the gas cooler/condenser to control the flow of refrigerant from the gas cooler/condenser, and a fan positioned to supply a flow of air into the gas cooler/condenser, a first temperature sensor positioned to detect an inlet air temperature of the flow of air into the gas cooler/condenser, a second temperature sensor positioned to detect an exit temperature of the flow of refrigerant from the gas cooler/condenser, and a pressure sensor positioned to detect an exit pressure of the refrigerant in the flow of refrigerant from the gas cooler/condenser, the controller comprising:

at least one input configured to receive the inlet air temperature from the first temperature sensor, the exit temperature from the second temperature sensor, and the exit pressure from the pressure sensor;

at least one output for controlling the valve and the fan;

a memory; and a processor configured by instructions stored in the memory to:

receive, through the at least one input, the inlet air temperature from the first temperature sensor;

determine a target exit pressure based on the inlet air temperature;

determine a target exit temperature based on the inlet air temperature; and control, through the at least one output, the valve based on the target exit pressure and the fan based on the target exit temperature both when the $CO_2$ refrigeration system is operating in a transcritical mode and when the $CO_2$ refrigeration system is operating in a subcritical mode, without determining whether the system is operating in the transcritical mode or the subcritical mode.

12. The controller of claim 11, wherein the processor is configured to:

receive, through the at least one input, the exit pressure of the refrigerant from the pressure sensor; and control the valve based on the target exit pressure by controlling the valve to cause the exit pressure of the refrigerant in the flow of refrigerant from the gas cooler/condenser to move toward the target exit pressure.

13. The controller of claim 12, wherein the processor is configured to determine the target exit pressure based on the inlet air temperature by inputting the inlet air temperature into an equation.

14. The controller of claim 13, wherein the equation comprises a polynomial equation.

15. The controller of claim 12, wherein the processor is configured to determine the target exit pressure based on the inlet air temperature using a lookup table stored in the memory.

16. The controller of claim 12, wherein the processor is configured to determine the target exit pressure by determining a saturation pressure of the refrigerant at a calculated temperature that is a sum of the inlet air temperature and a preset temperature differential.

17. The controller of claim 12, wherein the processor is configured to determine the target exit pressure to avoid a target exit pressure of 1070 pounds per square inch absolute (PSIA) plus or minus a preset pressure difference.

18. The controller of claim 12, wherein the processor is configured to:
   receive, through the at least one input, the exit temperature from the second temperature sensor; and
   control the fan based on the target exit pressure by controlling the fan to cause the exit temperature of the refrigerant in the flow of refrigerant from the gas cooler/condenser to move toward the target exit temperature.

19. The controller of claim 18, wherein the processor is configured to:
   control the fan to cause the exit temperature of the refrigerant in the flow of refrigerant from the gas cooler/condenser to move toward the target exit temperature by operating a motor of the fan at maximum speed when the inlet air temperature is above or equal to a preset temperature threshold; and
   control the fan to cause the exit temperature of the refrigerant in the flow of refrigerant from the gas cooler/condenser to move toward the target exit temperature by controlling a speed of the motor of the fan to selectively increase or decrease the flow of air into the gas cooler/condenser when the inlet air temperature is below the preset temperature threshold.

20. The controller of claim 18, wherein the processor is configured to determine the target exit temperature as:
   a sum of the inlet air temperature and a preset first air temperature differential when the inlet air temperature is above or equal to a preset temperature threshold; and
   a saturation temperature of the refrigerant at the target exit pressure minus a preset second air temperature differential when the inlet air temperature is below a preset temperature threshold.

* * * * *